United States Patent
Huang et al.

(10) Patent No.: US 10,057,599 B2
(45) Date of Patent: Aug. 21, 2018

(54) METHOD FOR PERFORMING IMAGE PROCESSING CONTROL WITH AID OF PREDETERMINED TILE PACKING, ASSOCIATED APPARATUS AND ASSOCIATED NON-TRANSITORY COMPUTER READABLE MEDIUM

(71) Applicant: MEDIATEK INC., Hsin-Chu (TW)

(72) Inventors: Chao-Chih Huang, New Taipei (TW); Chi-Cheng Ju, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 279 days.

(21) Appl. No.: 14/542,666

(22) Filed: Nov. 17, 2014

(65) Prior Publication Data
US 2015/0237374 A1 Aug. 20, 2015

Related U.S. Application Data (60) Provisional application No. 61/941,571, filed on Feb. 19, 2014.

(51) Int. Cl.
*H04N 7/18* (2006.01)
*H04N 11/02* (2006.01)
(Continued)

(52) U.S. Cl.
CPC .......... *H04N 19/60* (2014.11); *H04N 19/436* (2014.11); *H04N 19/91* (2014.11)

(58) Field of Classification Search
None
See application file for complete search history.

(56) References Cited

U.S. PATENT DOCUMENTS

| | | |
|---|---|---|
| 8,050,322 B2 | 11/2011 | Kim et al. |
| 2006/0156204 A1 | 7/2006 | Lee et al. |
| (Continued) | | |

FOREIGN PATENT DOCUMENTS

| | | |
|---|---|---|
| CN | 1705373 A | 12/2005 |
| CN | 101325698 A | 12/2008 |
| (Continued) | | |

OTHER PUBLICATIONS

Chao-Chih Huang, Title: Method and Apparatus for Packing Tile in Frame Through Loading Encoding-Related Information of Another Tile Above the Tile From Storage Device, pending U.S. Appl. No. 14/606,027, filed Jan. 27, 2015.
(Continued)

*Primary Examiner* — Chikaodili E Anyikire
(74) *Attorney, Agent, or Firm* — Oblon, McClelland, Maier & Neustadt, L.L.P.

(57) ABSTRACT

A method for performing image processing control and an associated apparatus are provided, where method may include the steps of: performing image coding on image information of at least one frame to generate encoded data of the at least one frame, wherein in the encoded data, a specific frame of the at least one frame includes a plurality of tiles, and each tile of the plurality of tiles includes a plurality of superblocks; and generating a bitstream carrying the encoded data of the at least one frame, wherein at least a partition type and a transform size of each superblock within a specific tile of the plurality of tiles are derivable from information corresponding to the specific tile within the encoded data, having no need to derive the partition type and the transform size from information corresponding to another tile of the plurality of tiles within the encoded data.

22 Claims, 7 Drawing Sheets

(51) Int. Cl.
*H04N 11/04* (2006.01)
*H04N 19/60* (2014.01)
*H04N 19/91* (2014.01)
*H04N 19/436* (2014.01)

(56) References Cited

U.S. PATENT DOCUMENTS

| | | | |
|---|---|---|---|
| 2012/0082243 A1 | 4/2012 | Baylon et al. | |
| 2012/0140830 A1* | 6/2012 | Xu | H04N 19/176 375/240.18 |
| 2013/0195175 A1 | 8/2013 | MacInnis | |
| 2013/0202051 A1* | 8/2013 | Zhou | H04N 19/436 375/240.26 |
| 2014/0037017 A1* | 2/2014 | Lin | H04N 19/423 375/240.29 |
| 2014/0247876 A1* | 9/2014 | Moriya | H04N 19/00951 375/240.12 |
| 2014/0355690 A1 | 12/2014 | Choi | |
| 2014/0362904 A1 | 12/2014 | Lim | |
| 2014/0362922 A1* | 12/2014 | Puri | H04N 19/61 375/240.16 |
| 2015/0229948 A1* | 8/2015 | Puri | H04N 19/615 375/240.03 |
| 2015/0350652 A1* | 12/2015 | Nellore | H04N 19/13 375/240.02 |
| 2016/0234499 A1 | 8/2016 | Chuang et al. | |

FOREIGN PATENT DOCUMENTS

| | | |
|---|---|---|
| CN | 103155556 A | 6/2013 |
| CN | 103518374 A | 1/2014 |
| WO | 2013/109115 A | 7/2013 |

OTHER PUBLICATIONS

Office Action dated Jun. 8, 2017, in co-pending U.S. Appl. No. 14/606,027.

Office Action dated Jun. 2, 2017, in Chinese Patent Application No. 201510069741.X.

Office Action dated Jun. 13, 2017, in Chinese Patent Application No. 201510083528.4.

Debargha Mukherjee et al., The latest open-source video codec VP9—An overview and preliminary results, 2013 IEEE, pp. 390-393, 2013.

\* cited by examiner

METHOD FOR PERFORMING IMAGE PROCESSING CONTROL WITH AID OF PREDETERMINED TILE PACKING, ASSOCIATED APPARATUS AND ASSOCIATED NON-TRANSITORY COMPUTER READABLE MEDIUM

CROSS REFERENCE TO RELATED APPLICATIONS

This application claims the benefit of U.S. Provisional Application No. 61/941,571, which was filed on Feb. 19, 2014, and is included herein by reference.

BACKGROUND

The present invention relates to video coding, and more particularly, to a method for performing image processing control, an associated apparatus and an associated non-transitory computer readable medium.

VP9 video compression technologies may rely on tile-based partitioning, which may be helpful on improving decoding performance. However, some problems such as some side effect may occur. For example, dependencies between a certain tile and its above one (i.e. the tile that is located above the certain tile) may exist, which may cause some restrictions regarding decoding. More particularly, regarding vertical dependency of tiles, when decoding a current superblock, a conventional decoder cannot identify the block width and the transform size of the above superblock (i.e. the superblock that is located above the current superblock) until the above superblock has been decoded (or unpacked). In addition, although all starting positions of the tiles in a frame are available after extracting the frame header of this frame, the vertical dependency of the tiles restricts the decoder to process only some tiles in the same row in parallel, without full parallelism corresponding to all of the tiles in this frame.

SUMMARY

It is therefore an objective of the claimed invention to provide a method for performing image processing control, an associated apparatus and an associated non-transitory computer readable medium, in order to solve the above-mentioned problems.

It is another objective of the claimed invention to provide a method for performing image processing control, an associated apparatus and an associated non-transitory computer readable medium, in order to enhance the performance of video decoding.

According to at least one preferred embodiment, a method for performing image processing control is provided, where the method can be applied to an electronic system comprising at least an electronic device. For example, this electronic device can be a video encoding device. The method may comprise the steps of: performing image coding on image information of at least one frame to generate encoded data of the at least one frame, wherein in the encoded data, a specific frame of the at least one frame comprises a plurality of tiles, and each tile of the plurality of tiles comprises a plurality of superblocks; and generating a bitstream carrying the encoded data of the at least one frame, wherein at least a partition type and a transform size of each superblock within a specific tile of the plurality of tiles are derivable from information corresponding to the specific tile within the encoded data, having no need to derive the partition type and the transform size from information corresponding to another tile of the plurality of tiles within the encoded data of the same frame (more particularly, within the encoded data of the specific frame which comprises the plurality of tiles). In addition, the method may, preferably, further comprise: utilizing another electronic device within the electronic system to recover the bitstream from an input signal of the other electronic device, and to decode at least one portion of the encoded data (of the same frame mentioned above) carried by the recovered bitstream in a parallel manner. For example, the other electronic device can be a video decoding device.

According to at least one preferred embodiment, an apparatus for performing image processing control is also provided, where the apparatus may comprise at least one portion of an electronic device, such as at least one portion (e.g. a portion or all) of the video encoding device mentioned above. The apparatus comprises an encoding circuit, and a tile packing circuit that is coupled to the encoding circuit. More particularly, the encoding circuit is arranged for performing image coding on image information of at least one frame to generate encoded data of the at least one frame, wherein in the encoded data, a specific frame of the at least one frame comprises a plurality of tiles, and each tile of the plurality of tiles comprises a plurality of superblocks. In addition, the tile packing circuit is arranged for generating a bitstream carrying the encoded data of the at least one frame, wherein at least a partition type and a transform size of each superblock within a specific tile of the plurality of tiles are derivable from information corresponding to the specific tile within the encoded data, having no need to derive the partition type and the transform size from information corresponding to another tile of the plurality of tiles within the encoded data of the same frame (more particularly, within the encoded data of the specific frame which comprises the plurality of tiles).

According to at least one preferred embodiment, an apparatus for performing image processing control is also provided, where the apparatus may comprise at least one portion of an electronic device, such as at least one portion (e.g. a portion or all) of the video decoding device mentioned above. The apparatus comprises a receiving circuit, and a decoding circuit that is coupled to the receiving circuit. More particularly, the receiving circuit is arranged for receiving an input signal carrying information that is directly or indirectly obtained from another electronic device (e.g. the video encoding device mentioned above), wherein the other electronic device performs image coding on image information of at least one frame to generate encoded data of the at least one frame, and generates a bitstream carrying the encoded data of the at least one frame, wherein in the encoded data, a specific frame of the at least one frame comprises a plurality of tiles, and each tile of the plurality of tiles comprises a plurality of superblocks. In addition, the receiving circuit recovers the bitstream from the input signal. Additionally, the decoding circuit is arranged for decoding at least one portion of the encoded data carried by the recovered bitstream in a parallel manner, wherein the decoding circuit obtains at least a partition type and a transform size of each superblock within a specific tile of the plurality of tiles from information corresponding to the specific tile within the encoded data, rather than obtaining the partition type and the transform size from information corresponding to another tile of the plurality of tiles within the encoded data of the same frame (more particularly, within the encoded data of the specific frame which comprises the plurality of tiles).

According to at least one preferred embodiment, a non-transitory computer readable medium is also provided, where the non-transitory computer readable medium stores a set of instructions which when executed performs an image processing method, and the image processing method comprises: performing an encoding process to each of a plurality of frames of a video content to generate tokenized coefficients of each of the plurality of frames; and while packing each of the plurality of frames into a plurality of tiles to generate a bitstream of the video content, preventing each frame from being divided along a predetermined direction to guarantee at least a partition type and a transform size of each of a plurality of superblocks within a specific tile of said frame are derived only from information corresponding to the specific tile.

It is an advantage of the present invention that the present invention method, the associated apparatus and the associated non-transitory computer readable medium can enhance the overall performance of the electronic system without introducing any side effect. In addition, the present invention method, the associated apparatus and the associated non-transitory computer readable medium can save hardware resources of tile-based processing, and more particularly, can save extra costs in bit-usage for redundant tiles. Additionally, in comparison with the related art, the present invention method, the associated apparatus and the associated non-transitory computer readable medium can prevent the related art problems.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
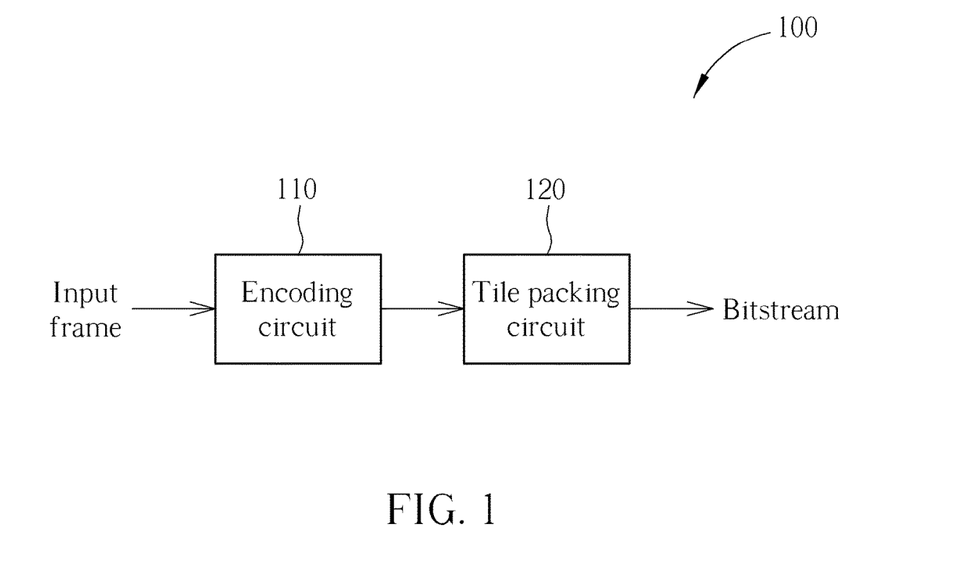
FIG. 1 is a diagram of an apparatus for performing image processing control according to an embodiment of the present invention, where this apparatus may comprise at least one portion of an electronic device, such as at least one portion (e.g. a portion or all) of a video encoding device.

FIG. 1 is a diagram of an apparatus 100 for performing image processing control according to an embodiment of the present invention, where this apparatus may comprise at least one portion of an electronic device, such as at least one portion (e.g. a portion or all) of a video encoding device. For example, the apparatus 100 may comprise a portion of this electronic device (e.g. the video encoding device), and more particularly, can be at least one hardware circuit such as at least one integrated circuit (IC) within this electronic device. In another example, the apparatus 100 can be the whole of this electronic device (e.g. the video encoding device). In another example, the apparatus 100 may comprise an electronic system comprising this electronic device (e.g. an electronic system comprising the video encoding device). Examples of this electronic device may include, but not limited to, a mobile phone (e.g. a multifunctional mobile phone), a tablet, and a personal computer such as a laptop computer or a desktop computer.

As shown in FIG. 1, the apparatus 100 may comprise an encoding circuit 110, and a tile packing circuit 120 that is coupled to the encoding circuit 110. More particularly, the encoding circuit 110 is arranged for performing image coding, such as image encoding operations associated with optimal tiling of frames. In addition, the tile packing circuit 120 is arranged for performing tile packing to generate a bitstream that complies with specific standards such as the VP9 video compression standard. This is for illustrative purposes only, and is not meant to be a limitation of the present invention. According to some embodiments of the present invention, at least one portion of components shown in FIG. 1 (e.g. the encoding circuit 110, and/or the tile packing circuit 120) can be implemented with a processor running some program codes. For example, this processor can be a computer processor such as a Central Processing Unit (CPU) or a Graphics Processing Unit (GPU).

Figure 2:
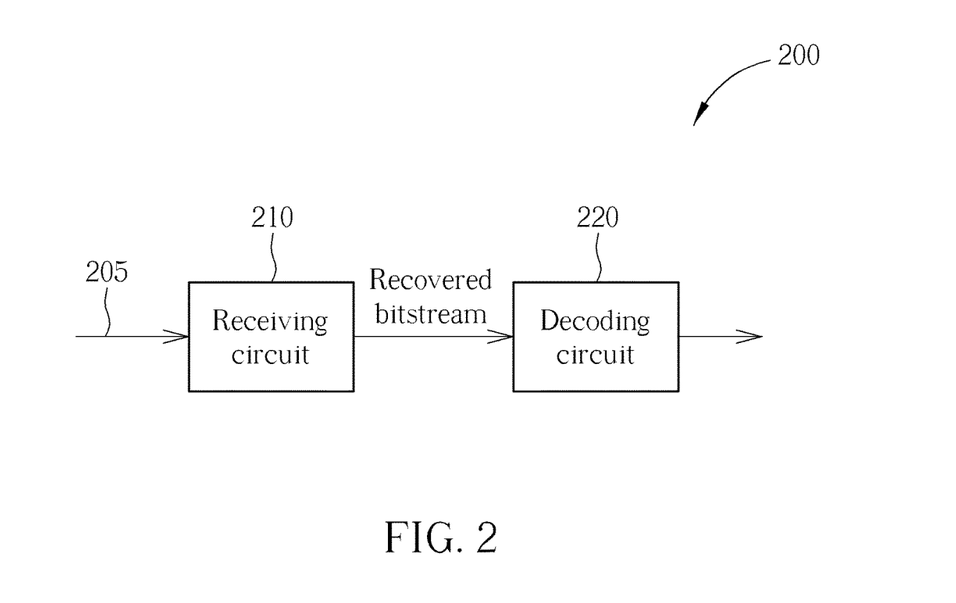
FIG. 2 is a diagram of an apparatus for performing image processing control according to another embodiment of the present invention, where this apparatus may comprise at least one portion of an electronic device, such as at least one portion (e.g. a portion or all) of a video decoding device.

FIG. 2 is a diagram of an apparatus 200 for performing image processing control according to another embodiment of the present invention, where this apparatus may comprise at least one portion of an electronic device, such as at least one portion (e.g. a portion or all) of a video decoding device. For example, the apparatus 200 may comprise a portion of this electronic device (e.g. the video decoding device), and more particularly, can be at least one hardware circuit such as at least one integrated circuit (IC) within this electronic device. In another example, the apparatus 200 can be the whole of this electronic device (e.g. the video decoding device). In another example, the apparatus 200 may comprise an electronic system comprising this electronic device (e.g. an electronic system comprising the video decoding device). Examples of this electronic device may include, but not limited to, a mobile phone (e.g. a multifunctional mobile phone), a tablet, and a personal computer such as a laptop computer or a desktop computer.

As shown in FIG. 2, the apparatus 200 may comprise a receiving circuit 210, and a decoding circuit 220 that is coupled to the receiving circuit 210. More particularly, the receiving circuit 210 is arranged for receiving an input signal 205 carrying information that is directly or indirectly obtained from another electronic device such as the video encoding device mentioned above. In addition, the receiving circuit 210 may recover the bitstream mentioned in the embodiment shown in FIG. 1 from the input signal 205. Additionally, the decoding circuit 220 is arranged for performing image decoding, such as image decoding operations corresponding to the image encoding operations mentioned in the embodiment shown in FIG. 1, according to the recovered bitstream in a parallel manner. This is for illustrative purposes only, and is not meant to be a limitation of the present invention. According to some embodiments of the present invention, at least one portion of components shown in FIG. 2 (e.g. the receiving circuit 210, and/or the decoding circuit 220) can be implemented with a processor running some program codes. For example, this processor can be a computer processor such as a CPU or a GPU.

Figure 3:
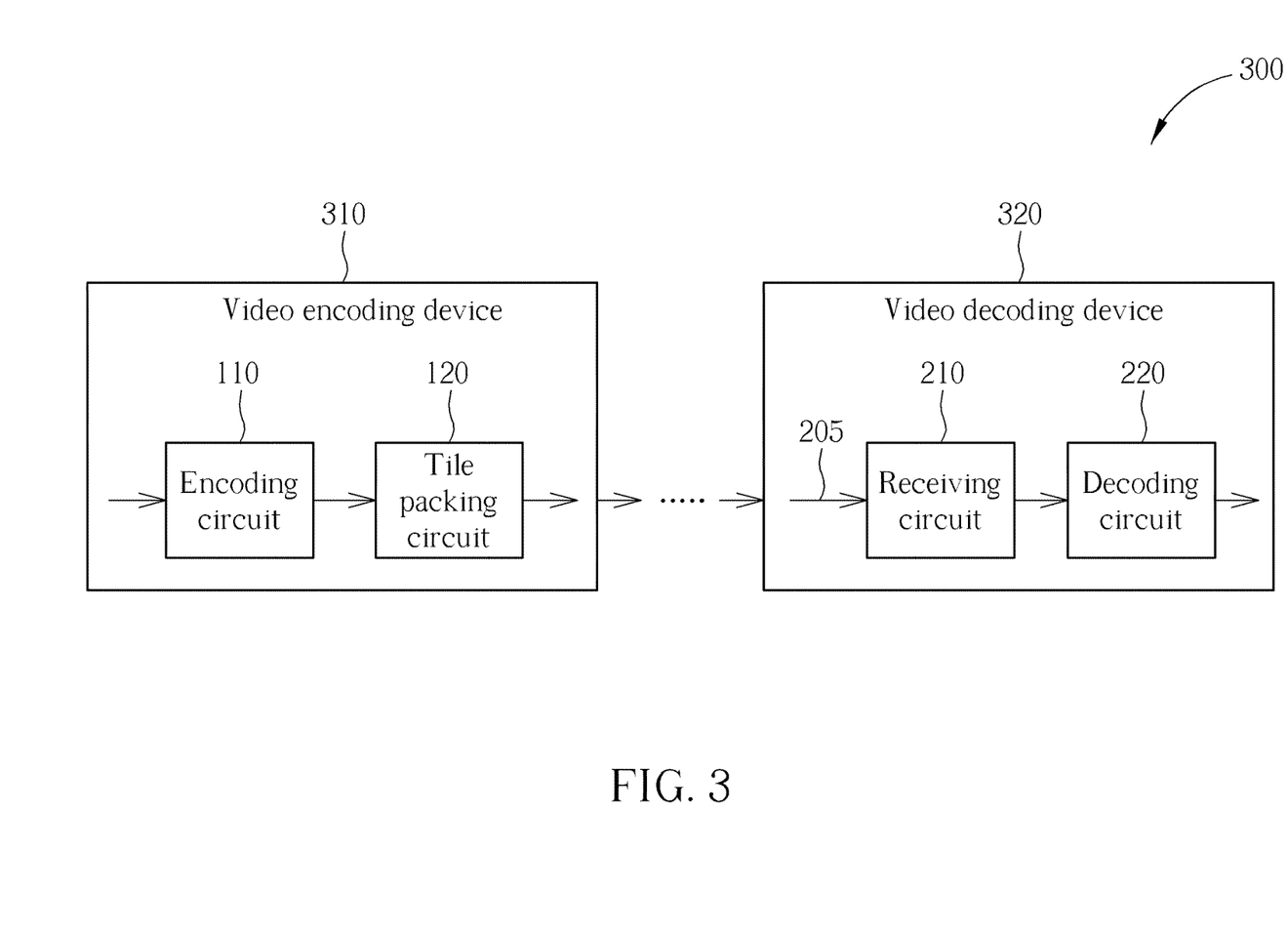
FIG. 3 is a diagram of an electronic system according to an embodiment of the present invention.

FIG. 3 is a diagram of an electronic system 300 according to an embodiment of the present invention. As shown in FIG. 3, the electronic system 300 may comprise a video encoding device 310, which can be taken as an example of the video encoding device mentioned in the embodiment shown in FIG. 1, where the video encoding device 310 may comprise the components in the architecture shown in FIG. 1. In addition, the electronic system 300 may further comprise a video decoding device 320, which can be taken as an example of the video decoding device mentioned in the embodiment shown in FIG. 2, where the video decoding device 320 may comprise the components in the architecture shown in FIG. 2.

In practice, the input signal 205 of the video decoding device 320 may carry information that is directly or indirectly obtained from the video encoding device 310. For example, the information may be transmitted from the video encoding device 310 to the video decoding device 320 through the Internet. In another example, the information may be transmitted from the video encoding device 310 to the video decoding device 320 through a communications network. In another example, the video encoding device 310 may store the information in a storage medium, such as a hard disk (HD) or a digital versatile disc (DVD), and the video decoding device 320 may access the storage medium to obtain the information.

Figure 4:
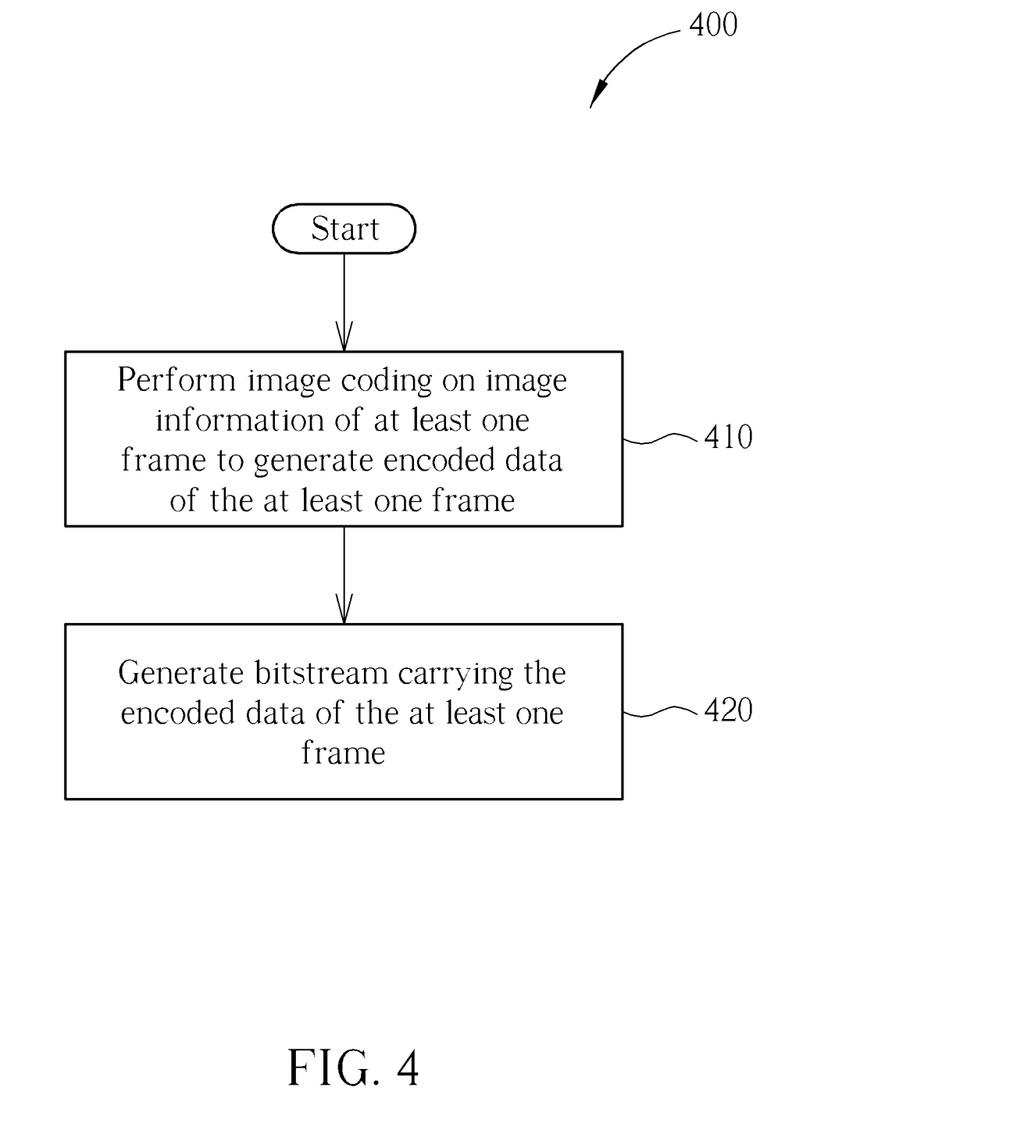
FIG. 4 illustrates a flowchart of a method for performing image processing control according to an embodiment of the present invention.

FIG. 4 illustrates a flowchart of a method 400 for performing image processing control according to an embodiment of the present invention. The method 400 shown in FIG. 4 can be applied to the apparatus 100 shown in FIG. 1 and the electronic device of the embodiment shown in FIG. 1, such as the video encoding device 310, and more particularly, can be applied to the apparatus 200 shown in FIG. 2 and the electronic device of the embodiment shown in FIG. 2, such as the video decoding device 320. This is for illustrative purposes only, and is not meant to be a limitation of the present invention. The method can be described as follows.

In Step 410, the encoding circuit 110 performs image coding on image information of at least one frame (e.g. one or more frames, such as the input frame shown in FIG. 1) to generate encoded data of the aforementioned at least one frame, where in the encoded data, a specific frame of the aforementioned at least one frame may comprise a plurality of tiles, and each tile of the plurality of tiles may comprise a plurality of superblocks.

In Step 420, the tile packing circuit 120 generates a bitstream carrying the encoded data of the aforementioned at least one frame, such as the bitstream mentioned in the embodiment shown in FIG. 1, whereat least a partition type and a transform size of each superblock within a specific tile of the plurality of tiles are derivable from information corresponding to the specific tile within the encoded data, having no need to derive the partition type and the transform size from information corresponding to another tile of the plurality of tiles within the encoded data. For example, the partition type and the transform size are obtained from the information corresponding to the specific tile without the information corresponding to the other tile within the encoded data. According to this embodiment, the bitstream may comply with the VP9 video compression standard.

More particularly, the method 200 may further comprise: utilizing the electronic device mentioned in the embodiment shown in FIG. 2, such as the video decoding device 320 within the electronic system 300, to recover the bitstream and to decode accordingly. For example, the receiving circuit 210 may receive the input signal 205 carrying the information that is directly or indirectly obtained from the video encoding device 310, and may recover the bitstream from the input signal 205, and the decoding circuit 220 may decode at least one portion (e.g. a portion or all) of the encoded data carried by the recovered bitstream in the parallel manner. In addition, the decoding circuit 220 may obtain at least the partition type and the transform size of each superblock within the specific tile of the plurality of tiles from the information corresponding to the specific tile within the encoded data, rather than obtaining the partition type and the transform size from the information corresponding to the other tile of the plurality of tiles within the encoded data of the same frame (more particularly, within the encoded data of the specific frame which may comprise the plurality of tiles). In practice, the aforementioned at least one portion of the encoded data typically comprises the information corresponding to the specific tile.

As mentioned above, regarding the operation of Step 420, at least the partition type and the transform size of each superblock within the specific tile are derivable from the information corresponding to the specific tile within the encoded data, having no need to derive the partition type and the transform size from the information corresponding to the other tile within the encoded data of the same frame. This is for illustrative purposes only, and is not meant to be a limitation of the present invention. According to some embodiments of the present invention, one or more other decoding parameters of each superblock within the specific tile may be derivable from the information corresponding to the specific tile within the encoded data, having no need to derive the aforementioned one or more other decoding parameters from the information corresponding to the other tile within the encoded data of the same frame.

According to some embodiments, the decoding circuit 220 may start processing multiple tiles of the plurality of tiles at the same time. That is, a frame will not be divided horizontally into tiles when generating the encoded data thereof, so that all tiles belonging to this frame can be decoded in parallel. More particularly, the decoding circuit 220 may start processing multiple sets of tiles of the plurality of tiles simultaneously, where each set of tiles within the multiple sets of tiles is a column of tiles within the plurality of tiles.

Figure 5:
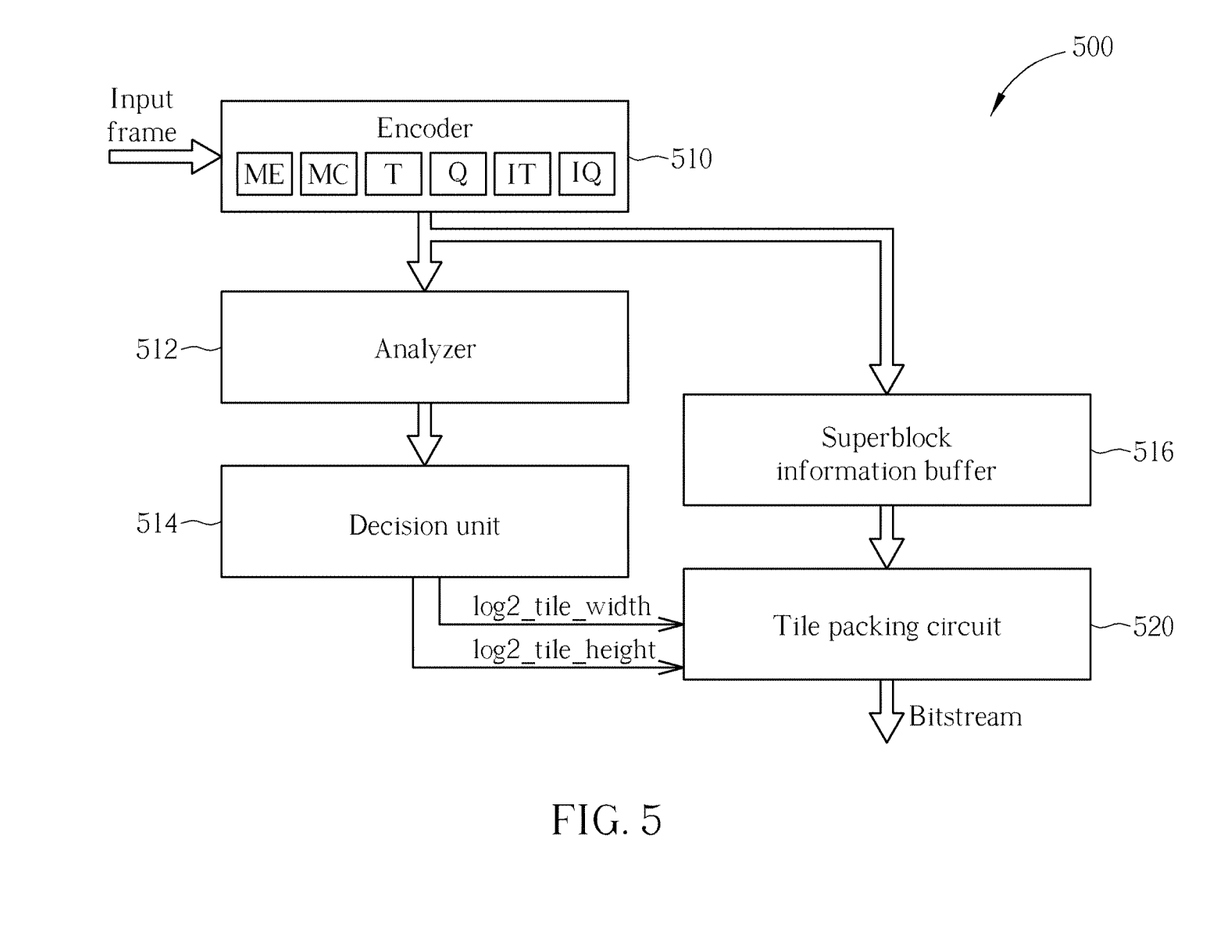
FIG. 5 illustrates an encoding architecture involved with the method shown in FIG. 4 according to an embodiment of the present invention.

FIG. 5 illustrates an encoding architecture 500 involved with the method 400 shown in FIG. 4 according to an embodiment of the present invention, where the encoding architecture 500 can be referred to as an optimal tiling encoder. According to this embodiment, the encoding architecture 500 may comprise an encoder 510, an analyzer 512 (which may comprise some logic components such as some logic gates, for example), a decision unit 514 (e.g. a decision logic circuit), a superblock (SB) information buffer 516, and a tile packing circuit 520, where the encoder 510 may comprise a motion estimation (ME) unit, a motion compensation (MC) unit, a transform unit, a quantization unit, an inverse transform (IT) unit, and an inverse quantization (IQ) unit (respectively labeled "ME", "MC", "T", "Q", "IT", and "IQ" in FIG. 5). The combination of the encoder 510, the analyzer 512, the decision unit 514, and the superblock information buffer 516 can be taken as an example of the encoding circuit 110, and the tile packing circuit 520 can be taken as an example of the tile packing circuit 120.

Please note that the operations of the units within the encoder 510 can be implemented according to the related art, except that, before the tile packing circuit 520 performs tile packing, the analyzer 512 analyzes the data in the encoder 510 to generate analyzed results regarding tiling characteristics of each superblock within the specific tile and the decision unit 514 determines, according to the analyzed results, the parameters log 2_tile_width and log 2_tile_height of each superblock within the specific tile, for use of performing tile packing control. Thus, the tile packing circuit 520 can perform tile packing control corresponding to the parameters log 2_tile_width and log 2_tile_height that are determined by the decision unit 514 according to the analyzed results. As a result of encoding by utilizing the encoding architecture 500 shown in FIG. 5, both of the partition type and the transform size of the specific tile can be decoded by the decoding circuit 220 independently, where during decoding the partition type and the transform size of the specific tile, the decoding circuit 220 does not need information of other tiles within the plurality of tiles, such as the information corresponding to the other tile mentioned above. This is for illustrative purposes only, and is not meant to be a limitation of the present invention.

According to some embodiments of the present invention, before the tile packing circuit 520 performs tile packing, the analyzer 512 analyzes the data in the encoder 510 to generate the analyzed results regarding the tiling characteristics of each superblock within the specific tile and the decision unit 514 is capable of choosing, according to the analyzed results, a specific predetermined tiling control scheme from a plurality of predetermined tiling control schemes. More particularly, the analyzer 512 may collect superblock information, and the decision unit 514 may determine the specific predetermined tiling control scheme by evaluating all possible tiling schemes within the plurality of predetermined tiling control schemes. For example, the following test operations may be performed. Based on the superblock information collected by the analyzer 512, the decision unit 514 may check each superblock at all tile edges, and more particularly, may check whether any dependency between this superblock and its adjacent superblock across the tile edge exists for a predetermined tiling control scheme being tested. When it is detected that this dependency exists for the predetermined tiling control scheme being tested, the decision unit 514 may mark the corresponding edge with a rejection flag which may indicate that the predetermined tiling control scheme being tested is not suggested for tiling, and therefore the predetermined tiling control scheme being tested tile scheme is rejected. For the surviving tiling control schemes within the plurality of predetermined tiling control schemes, such as the predetermined tiling control schemes that have not been marked with the rejection flag, the decision unit 514 may estimate the bit-rates of these predetermined tiling control schemes and choose, from these predetermined tiling control schemes, the one corresponding to the minimum bit-rate as the specific predetermined tiling control scheme. This is for illustrative purposes only, and is not meant to be a limitation of the present invention.

According to some embodiments of the present invention, regarding the decision unit 514, for each superblock near the tile boundary, it is needed to make some decoding parameters such as the partition type and the transform size (e.g. those for all tiles) be able to be decoded in parallel, without availability of adjacent superblock. For example, suppose that, when decoding the partition type of a superblock in the specific tile, such as a current superblock SB_C (not shown in FIG. 5), a tile boundary exists above the current superblock SB_C. During decoding the partition type of the current superblock SB_C, if the offset parameter offset_above of the above superblock SB_A (not shown in FIG. 5) cannot be determined, the decision unit 514 may determine that the dependency does exist so the corresponding tile boundary does not exist; otherwise, the decision unit 514 may determine that the tile boundary exists. It is similar for the decision unit 514 to determine whether a tile boundary at the left of the current superblock SB_C exists. This is for illustrative purposes only, and is not meant to be a limitation of the present invention.

According to some embodiments of the present invention, the encoding architecture 500 shown in FIG. 5 may vary. For example, in a situation where at least one portion (e.g. a portion or all) of the analyzer 512, the decision unit 514, and the superblock information buffer 516 are omitted, the encoder 510 may utilize a set of predetermined values as the parameters log 2_tile_width and log 2_tile_height of each superblock within the specific tile, respectively, and directly send the parameters log 2_tile_width and log 2_tile_height (i.e. this set of predetermined values, in this example) to the tile packing circuit 520, for use of performing tile packing control, where the encoder 510 can be taken as an example of the encoding circuit 110, and the tile packing circuit 520 can be taken as an example of the tile packing circuit 120. Thus, the tile packing circuit 520 can perform tile packing control corresponding to the parameters log 2_tile_width and log 2_tile_height that are set as this set of predetermined values by the encoder 510 of this example. As a result of encoding by utilizing the encoding architecture 500 of this example, both of the partition type and the transform size of the specific tile can be decoded by the decoding circuit 220 independently, where during decoding the partition type and the transform size of the specific tile, the decoding circuit 220 does not need information of other tiles within the plurality of tiles, such as the information corresponding to the other tile mentioned above. This is for illustrative purposes only, and is not meant to be a limitation of the present invention.

According to some embodiments of the present invention, the encoding architecture 500 shown in FIG. 5 may vary. For example, in a situation where at least one portion (e.g. a portion or all) of the analyzer 512, the decision unit 514, and the superblock information buffer 516 are omitted, based on at least one look up table (LUT), the encoder 510 may utilize a set of LUT values as the parameters log 2_tile_width and log 2_tile_height of each superblock within the specific tile, respectively, and directly send the parameters log 2_tile_width and log 2_tile_height (i.e. this set of LUT values, in this example) to the tile packing circuit 520, for use of performing tile packing control, where the encoder 510 can be taken as an example of the encoding circuit 110, and the tile packing circuit 520 can be taken as an example of the tile packing circuit 120. Thus, the tile packing circuit 520 can perform tile packing control corresponding to the parameters log 2_tile_width and log 2_tile_height that are set as this set of LUT values by the encoder 510 of this example. As a result of encoding by utilizing the encoding architecture 500 of this example, both of the partition type and the transform size of the specific tile can be decoded by the decoding circuit 220 independently, where during decoding the partition type and the transform size of the specific tile, the decoding circuit 220 does not need information of other tiles within the plurality of tiles, such as the information corresponding to the other tile mentioned above. This is for illustrative purposes only, and is not meant to be a limitation of the present invention.

Figure 6:
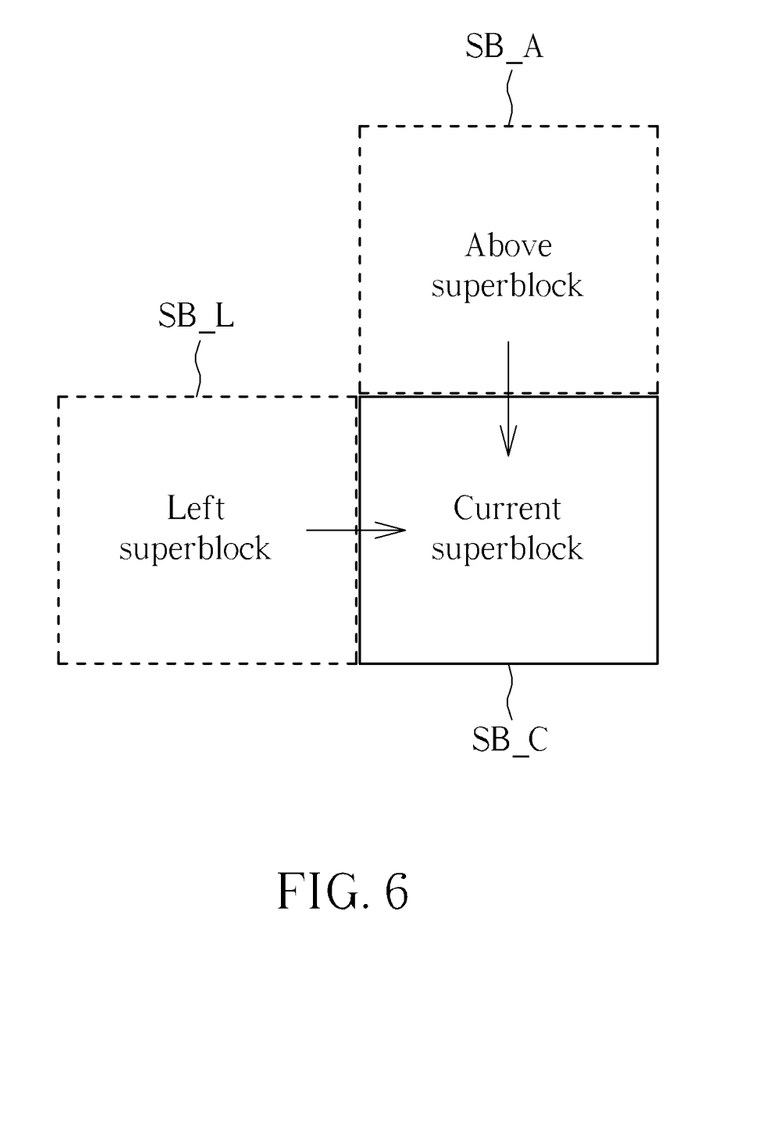
FIG. 6 illustrates some adjacent superblocks associated with the current superblock according to an embodiment of the present invention.

FIG. 6 illustrates some adjacent superblocks associated with the current superblock according to an embodiment of the present invention. In practice, when coding the partition type of a superblock in the specific tile, such as a current superblock SB_C, the encoding circuit 110 may need the partition sizes of its above and left ones, such as the above superblock SB_A and the left superblock SB_L shown in FIG. 6, where the partition type of the current superblock SB_C may be associated with the parameter Prob_offset, which can be expressed as follows.

Prob_offset=offset_above+offset_left*2;

where the parameters offset_above and offset_left can be derived by comparing the partition sizes of the above superblock SB_A and the left superblock SB_L with the partition size of the current superblock SB_C, respectively. For example, if any above adjacent partitions in the above superblock SB_A that is above the current superblock SB_C has a smaller width than that of the current superblock SB_C, the parameter offset_above is equal to the value 1; otherwise, the parameter offset_above is equal to the value 0. In another example, if any left adjacent partitions in the left superblock SB_L that is at the left side of the current superblock SB_C has a smaller height than that of the current superblock SB_C, the parameter offset_left is equal to the value 1; otherwise, the parameter offset_left is equal to the value 0. However, if the left superblock SB_L and the current superblock SB_C are in different tiles, the parameter offset_left is equal to the value 0. Please note that, even if an above partition locates in a different tile (i.e. a tile that is different from the tile where the current superblock SB_C locates), the reference is still valid.

Regarding the transform size dependency, when coding the transform size of the aforementioned superblock in the specific tile, such as the current superblock SB_C, the encoding circuit 110 may choose a specific probability set from a plurality of probability sets to determine the transform size thereof, where the parameter Maximum_tx_size which represents the maximum allowable transform size of the current superblock SB_C can be used during choosing the specific probability set from the plurality of probability sets. For example, the parameter Maximum_tx_size may be associated with the parameters Tx_size_above and Tx_size_left. More particularly, if the operational result of applying the NOT operator on the skip coefficient skip_coeff of the above superblock SB_A is TRUE (e.g. the logical value 1), the parameter Tx_size_above is equal to the transform size (or the Tx size) of the above superblock SB_A; otherwise, the parameter Tx_size_above is equal to the parameter Maximum_tx_size. In addition, if the operational result of applying the NOT operator on the skip coefficient skip_coeff of the left superblock SB_L is TRUE (e.g. the logical value 1), the parameter Tx_size_left is equal to the parameter the transform size (or the Tx size) of the left superblock SB_L; otherwise, the parameter Tx_size_left is equal to the parameter Maximum_tx_size. Additionally, if the summation of the parameters Tx_size_above and Tx_size_left is greater than the parameter Maximum_tx_size (i.e. Tx_size_above+Tx_size_left>Maximum_tx_size), the encoding circuit 110 uses the probability set #1; otherwise, the encoding circuit 110 uses the probability set #0. For some implementation details regarding the probability set #1 and the probability set #0, please refer to the VP9 video compression standard.

In practice, there may be some limitations or requirements of tiling. First of all, each of the number of tile rows and the number of tile columns should be in the power of two (e.g. $2^n$, where the notation "n" can be an integer that is greater than or equal to zero, where during tiling, a frame may be divided by any of 2, 4, 8, etc., vertically or horizontally. In addition, each of the minimum width and the minimum height of a tile is equivalent to 256 pixels. For example, a "1280×720" frame which comprises (1280*720) pixels can be divided to (4*2) tiles in maximum. In another example, a "1920 ×1080" frame which comprises (1920*1080) pixels can be divided to (4*4) tiles in maximum. Typically, it is required for the apparatus 100 (e.g. the video encoding device 310 in the embodiment shown in FIG. 3) to add offsets of all tiles in a frame to the frame header of this frame, so that the apparatus 200 (e.g. the video decoding device 320 in the embodiment shown in FIG. 3) may locate all sub-streams of tiles after extracting the frame header.

Figure 7:
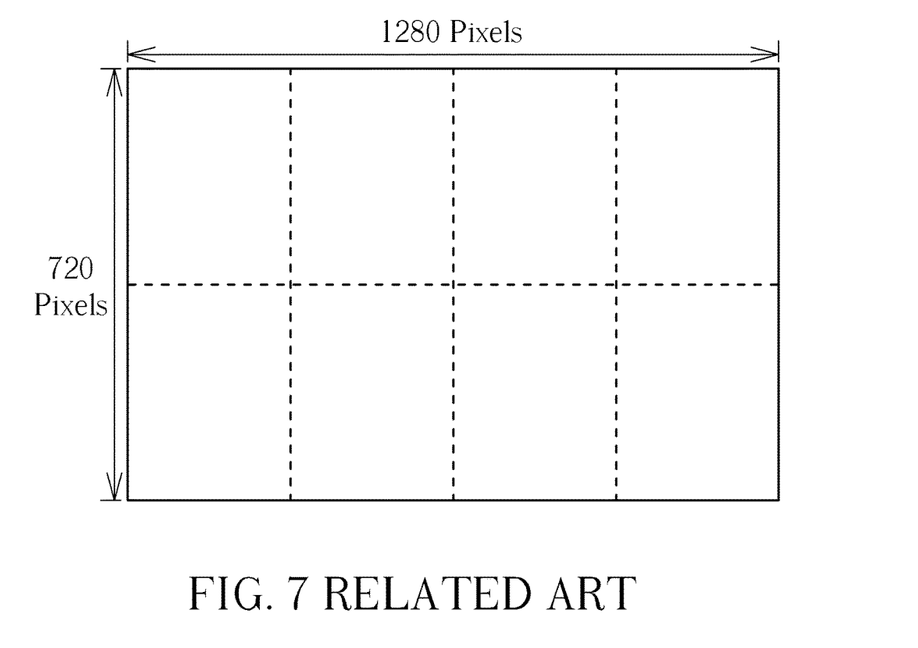
FIG. 7 illustrates a conventional tiling control scheme of a general encoder system according to the related art.

FIG. 7 illustrates a conventional tiling control scheme of a general encoder system according to the related art. For example, when processing some "1280×720" frames, each of which comprises (1280 *720)pixels, the general encoder system of the related art may perform the conventional tiling operations on each of these frames to encode these frames, where each of these frames may be divided into (4*2) tiles such as those shown in FIG. 7 (e.g. the tiles illustrated with the vertical and the horizontal dashed lines in FIG. 7). Please note that the tile packing performed by this general encoder system typically causes the related art problems mentioned above.

Figure 8:
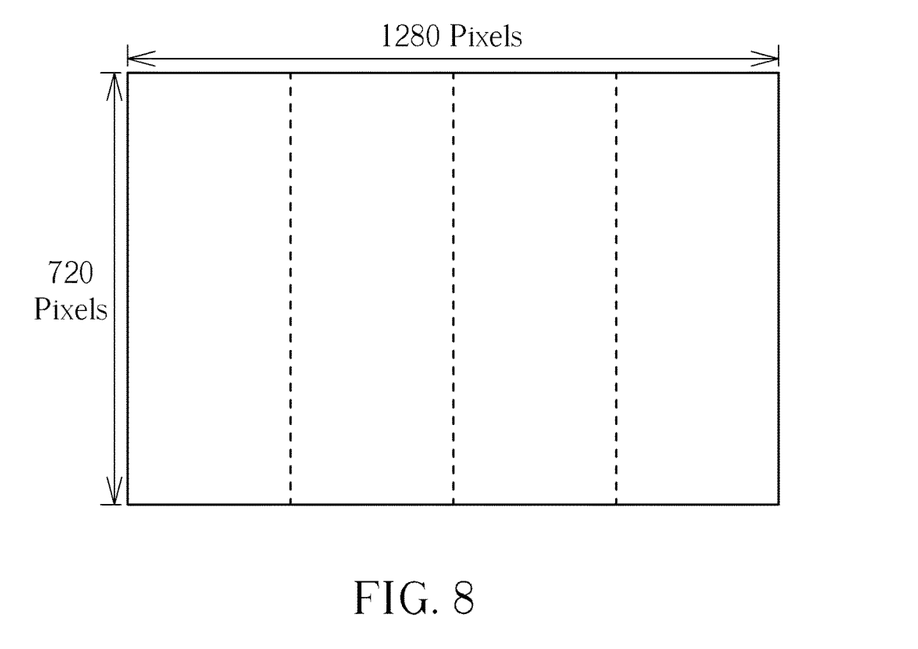
FIG. 8 illustrates an optimal tiling control scheme involved with the method shown in FIG. 4 according to an embodiment of the present invention.

FIG. 8 illustrates an optimal tiling control scheme involved with the method 400 shown in FIG. 4 according to an embodiment of the present invention. For example, when processing some "1280×720" frames, each of which comprises (1280*720) pixels, the encoding circuit 110 of this embodiment may perform optimal tiling on each of these frames to encode these frames, where each of these frames may be divided into (4*1) tiles such as those shown in FIG. 8 (e.g. the tiles illustrated with the vertical dashed lines in FIG. 8). In addition, the encoding circuit 110 of this embodiment may control the tile packing circuit 120 to perform tile packing corresponding to the optimal tiling of this embodiment. In comparison with the conventional tiling control scheme shown in FIG. 7, the optimal tiling control scheme shown in FIG. 8 can prevent the related art problems.

Figure 9:
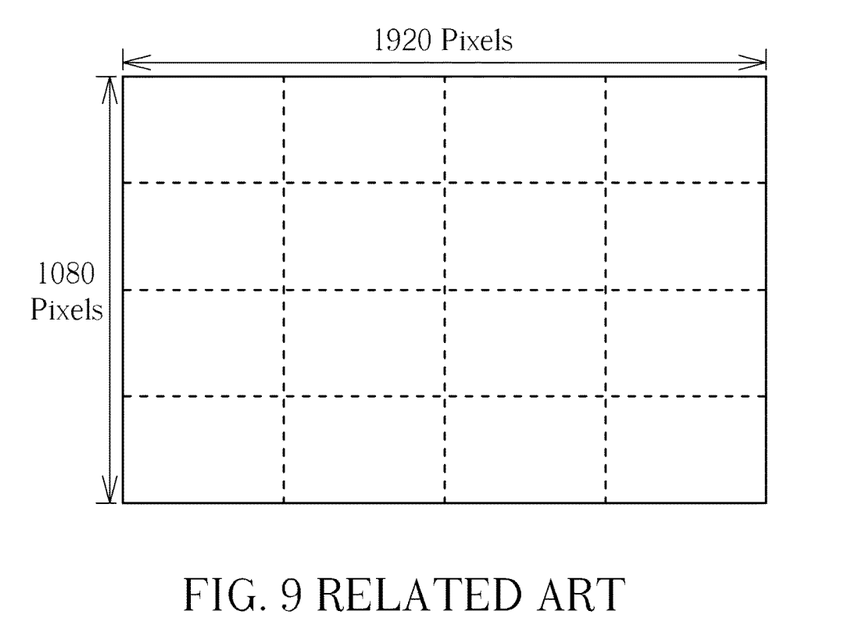
FIG. 9 illustrates a conventional tiling control scheme of a general encoder system according to the related art.

FIG. 9 illustrates a conventional tiling control scheme of a general encoder system according to the related art. For example, when processing some "1920×1080" frames, each of which comprises (1920*1080) pixels, the general encoder system of the related art may perform the conventional tiling operations on each of these frames to encode these frames, where each of these frames may be divided into (4*4) tiles such as those shown in FIG. 9 (e.g. the tiles illustrated with the vertical and the horizontal dashed lines in FIG. 9). Please note that the tile packing performed by this general encoder system typically causes the related art problems mentioned above.

Figure 10:
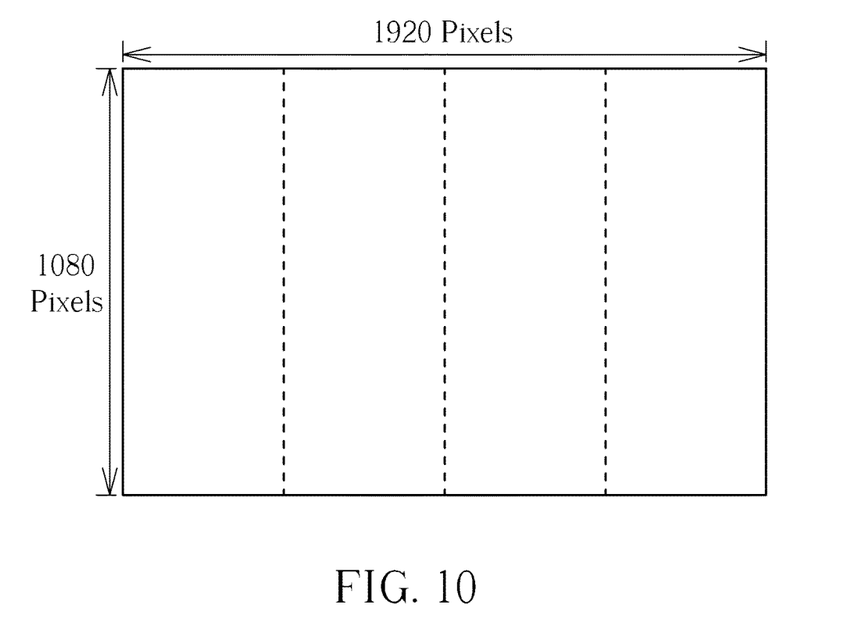
FIG. 10 illustrates an optimal tiling control scheme involved with the method shown in FIG. 4 according to another embodiment of the present invention.

FIG. 10 illustrates an optimal tiling control scheme involved with the method 400 shown in FIG. 4 according to another embodiment of the present invention. For example, when processing some "1920×1080" frames, each of which comprises (1920*1080) pixels, the encoding circuit 110 of this embodiment may perform optimal tiling on each of these frames to encode these frames, where each of these frames may be divided into (4*1) tiles such as those shown in FIG. 10 (e.g. the tiles illustrated with the vertical dashed lines in FIG. 10). In addition, the encoding circuit 110 of this embodiment may control the tile packing circuit 120 to perform tile packing corresponding to the optimal tiling of this embodiment. In comparison with the conventional tiling control scheme shown in FIG. 9, the optimal tiling control scheme shown in FIG. 10 can prevent the related art problems.

According to some embodiments, a non-transitory computer readable medium is also provided, where the non-transitory computer readable medium may stores a set of instructions. When the set of instructions is executed, for example, by a processor such as the processor mentioned in one or more of some embodiments described above, this processor may perform operations according to an image processing method (e.g. the method 400 of the embodiment shown in FIG. 4, or the method 400 of any of some associated embodiments described above). Thus, the set of instructions is arranged to instruct this processor to control the electronic device where the processor is positioned to operate according to the image processing method. More particularly, this image processing method may comprise the steps of: performing an encoding process to each of a plurality of frames of a video content to generate tokenized coefficients of each of the plurality of frames; and while packing each of the plurality of frames into a plurality of tiles to generate a bitstream of the video content, preventing each frame from being divided along a predetermined direction to guarantee at least a partition type and a transform size of each of a plurality of superblocks within a specific tile of said frame are derived only from information corresponding to the specific tile.

For example, the step of performing the encoding process to each of the plurality of frames of the video content to generate tokenized coefficients of each of the plurality of frames may comprise all operations for the frame performed before packing the frame. In addition, implementation details of preventing each frame of the plurality of frames from being divided along the predetermined direction may vary. For example, based on some configuration settings, the parameters log 2_tile_width and log 2_tile_height may be determined to prevent each frame of the plurality of frames from being divided along the predetermined direction. In another example, based on the architecture shown in FIG. 5, the analyzer 512 and the decision unit 514 may control the operations of this architecture to prevent each frame of the plurality of frames from being divided along the predetermined direction.

According to one or more of these embodiments, the predetermined direction may be horizontal. Consequently, there would be only one tile row in each frame of the plurality of frames after packing, where the term "tile row" mentioned hereinafter may mean a single tile or a combination of tiles arranged horizontally, such as that illustrated in any of the embodiments respectively shown in FIG. 8 and FIG. 10. According one or more of these embodiments, the bitstream may comply with VP9 video compression standard. Each of the plurality of tiles belonging to one frame carried by the bitstream is parallelly decodable. That is, each tile of the plurality of tiles belonging to the same frame carried by the bitstream may be decoded in a parallel manner. For example, the partition type and the transform size of any superblock carried by the bitstream may have no dependency between any two of the tiles within an identical frame.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing image processing control, the method being applied to an electronic system comprising at least an electronic device, the method comprising the steps of:

performing image coding on image information of at least one frame to generate encoded data of the at least one frame, wherein in the encoded data, a specific frame of the at least one frame comprises a plurality of tiles, and each tile of the plurality of tiles comprises a plurality of superblocks, and wherein the specific frame includes a plurality of divisions forming the plurality of tiles; and generating a bitstream carrying the encoded data of the at least one frame, wherein at least a partition type and a transform size of each superblock within a specific tile of the plurality of tiles are derivable from information corresponding to the specific tile within the encoded data, having no need to derive the partition type and the transform size from information corresponding to another tile of the plurality of tiles within the encoded data, wherein at least one division of the plurality of divisions, which forms the specific tile, is positioned in a single direction within the specific frame without any other division of the plurality of divisions, which forms the another tile, and wherein the at least one division of the plurality of divisions is based on a plurality of parameters that govern width and height of each one of the plurality of superblocks and that prevent the plurality of divisions from being positioned in a direction that is perpendicular to the single direction.

2. The method of claim 1, wherein the bitstream complies with VP9 video compression standard.

3. The method of claim 1, wherein the partition type and the transform size are obtained from the information corresponding to the specific tile without the information corresponding to the other tile within the encoded data.

4. The method of claim 1, further comprising:

utilizing another electronic device within the electronic system to recover the bitstream from an input signal of the other electronic device, and to decode at least one portion of the encoded data carried by the recovered bitstream in a parallel manner.

5. The method of claim 4, wherein the at least one portion of the encoded data comprises the information corresponding to the specific tile.

6. The method of claim 4, wherein the step of decoding the at least one portion of the encoded data carried by the bitstream in the parallel manner further comprises:
   starting processing multiple tiles of the plurality of tiles simultaneously.

7. The method of claim 4, wherein the step of decoding the at least one portion of the encoded data carried by the bitstream in the parallel manner further comprises:
   starting processing multiple sets of tiles of the plurality of tiles simultaneously, wherein each set of tiles within the multiple sets of tiles is a column of tiles within the plurality of tiles.

8. An apparatus for performing image processing control, the apparatus comprising at least one portion of an electronic device, the apparatus comprising:
   an encoding circuit, arranged for performing image coding on image information of at least one frame to generate encoded data of the at least one frame, wherein in the encoded data, a specific frame of the at least one frame comprises a plurality of tiles, and each tile of the plurality of tiles comprises a plurality of superblocks, and wherein the specific frame includes a plurality of divisions forming the plurality of tiles; and
   a tile packing circuit, coupled to the encoding circuit, arranged for generating a bitstream carrying the encoded data of the at least one frame, wherein at least a partition type and a transform size of each superblock within a specific tile of the plurality of tiles are derivable from information corresponding to the specific tile within the encoded data, having no need to derive the partition type and the transform size from information corresponding to another tile of the plurality of tiles within the encoded data,
   wherein at least one division of the plurality of divisions, which forms the specific tile, is positioned in a single direction within the specific frame without any other division of the plurality of divisions, which forms the another tile, and
   wherein the at least one division of the plurality of divisions is based on a plurality of parameters that govern width and height of each one of the plurality of superblocks and that prevent the plurality of divisions from being positioned in a direction that is perpendicular to the single direction.

9. The apparatus of claim 8, wherein the bitstream complies with VP9 video compression standard.

10. The apparatus of claim 8, wherein the partition type and the transform size are obtained from the information corresponding to the specific tile without the information corresponding to the other tile within the encoded data.

11. An apparatus for performing image processing control, the apparatus comprising at least one portion of an electronic device, the apparatus comprising:
   a receiving circuit, arranged for receiving an input signal carrying information that is directly or indirectly obtained from another electronic device, wherein the other electronic device performs image coding on image information of at least one frame to generate encoded data of the at least one frame, and generates a bitstream carrying the encoded data of the at least one frame, wherein in the encoded data, a specific frame of the at least one frame comprises a plurality of tiles, and each tile of the plurality of tiles comprises a plurality of superblocks, wherein the specific frame includes a plurality of divisions forming the plurality of tiles, and wherein the receiving circuit recovers the bitstream from the input signal; and
   a decoding circuit, coupled to the receiving circuit, arranged for decoding at least one portion of the encoded data carried by the recovered bitstream in a parallel manner, wherein the decoding circuit obtains at least a partition type and a transform size of each superblock within a specific tile of the plurality of tiles from information corresponding to the specific tile within the encoded data, rather than obtaining the partition type and the transform size from information corresponding to another tile of the plurality of tiles within the encoded data,
   wherein at least one division of the plurality of divisions, which forms the specific tile, is positioned in a single direction within the specific frame without any other division of the plurality of divisions, which forms the another tile, and
   wherein the at least one division of the plurality of divisions is based on a plurality of parameters that govern width and height of each one of the plurality of superblocks and that prevent the plurality of divisions from being positioned in a direction that is perpendicular to the single direction.

12. The apparatus of claim 11, wherein the at least one portion of the encoded data comprises the information corresponding to the specific tile.

13. The apparatus of claim 11, wherein the decoding circuit starts processing multiple tiles of the plurality of tiles simultaneously.

14. The apparatus of claim 11, wherein the decoding circuit starts processing multiple sets of tiles of the plurality of tiles simultaneously, wherein each set of tiles within the multiple sets of tiles is a column of tiles within the plurality of tiles.

15. A non-transitory computer readable medium storing a set of instructions which when executed performs an image processing method, the image processing method comprising:
   performing an encoding process to each of a plurality of frames of a video content to generate tokenized coefficients of each of the plurality of frames; and
   while packing each of the plurality of frames into a plurality of tiles to generate a bitstream of the video content, preventing each frame from being divided along a predetermined direction to guarantee at least a partition type and a transform size of each of a plurality of superblocks within a specific tile of said frame are derived only from information corresponding to the specific tile, wherein the frame includes a plurality of divisions forming the plurality of tiles,
   wherein at least one division of the plurality of divisions, which forms the specific tile, is positioned in a single direction within the frame without any other division of the plurality of divisions, which forms another tile, and
   wherein the at least one division of the plurality of divisions is based on a plurality of parameters that govern width and height of each one of the plurality of superblocks and that prevent the plurality of divisions from being positioned in a direction that is perpendicular to the single direction.

16. The non-transitory computer readable medium of claim 15, wherein the predetermined direction is horizontal.

17. The non-transitory computer readable medium of claim 15, wherein each of the plurality of frames has only one tile row after packing.

18. The non-transitory computer readable medium of claim 15, wherein the bitstream complies with VP9 video compression standard.

19. The non-transitory computer readable medium of claim 15, wherein each of the plurality of tiles belonging to one frame carried by the bitstream is parallelly decodable.

20. The non-transitory computer readable medium of claim 15, wherein the partition type and the transform size of any superblock carried by the bitstream have no dependency between any two of the plurality of tiles within an identical frame.

21. The method of claim 1, wherein the partition type comprises partition sizes and locations for the super blocks.

22. The method of claim 1, wherein the plurality of divisions are only formed in the single direction.

* * * * *